United States Patent Office 3,365,169
Patented Jan. 23, 1968

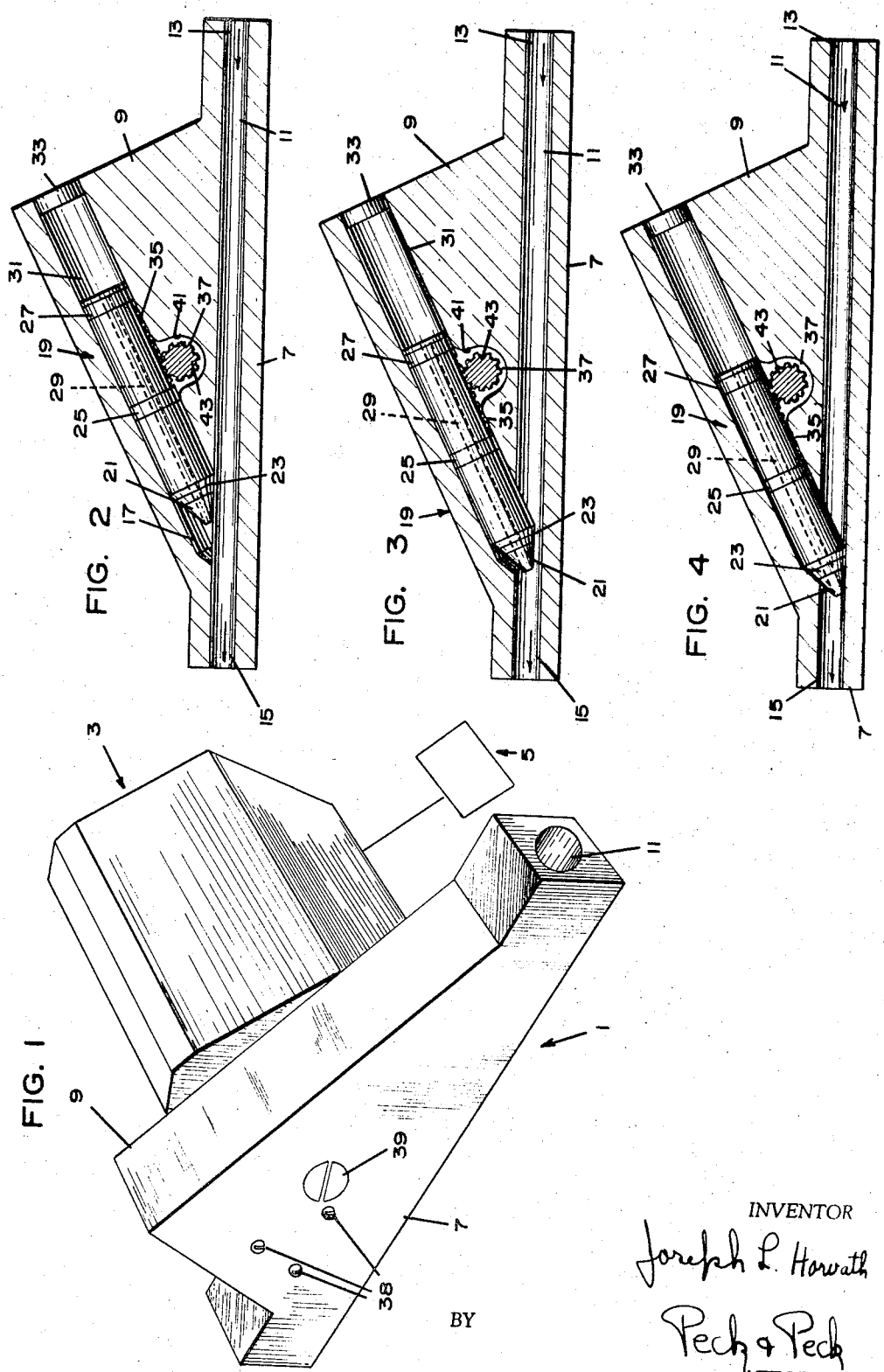

3,365,169
AUTOMATIC METERING VALVE
Joseph L. Horvath, 4060 Houston Place,
Corvallis, Oreg. 97330
Filed May 10, 1965, Ser. No. 454,255
3 Claims. (Cl. 251—205)

ABSTRACT OF THE DISCLOSURE

A metering valve which is provided with a valve body having a straight through fluid flow path, and a valve control member is operable in the valve body and the operating nose thereof extends at various positions into the fluid flow path and is of conical configuration so that the lower arcuate surface thereof is substantially parallel to the axis of the fluid flow line. The valve control member is operable in an opening in the valve body and is provided with a longitudinally extending duct therethrough which extends through the operating nose and the opposite end of the valve control member, and the valve control member is of less length than the opening, so that the duct through the valve control member comprises a pressure equalization duct, while the area in the opening behind the valve control member comprises a pressure equalization chamber.

This invention relates broadly to the art of valves, and in its more specific aspects, it relates to valves wherein the flow is laminar and the control of the flow is fully automatic, the valve is endowed with infinite pressure capability and the valve opening and closing element operates in an area lower than line pressure; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within in the spirit and scope thereof.

In the development of my valve, it has been one of my prime purposes to devise a valve and valve body which has an interior flow line contour which offers the least resistance to flow of fluids therethrough and permits a substantially unbroken flow of the fluid. I have so designed this valve that in the control of fluids passing therethrough by the use of the flow controlling plunger, turbulence will be reduced, even in partially closed positions of the plunger, to thereby maintain to the greatest possible extent the desirable streamline or laminar flow of the fluids passing through and being controlled by the valves. As will be explained in detail hereinafter, one of the structural factors by which I achieve this highly desirable result is the configuration of the flow line closing portion of the flow controlling plunger which itself is of streamline contour in substantial parallelism with the axis of the fluid flow line of the valve.

It is known in this art that flow through a valve is preferably streamline or laminar since streamline flow provides the most flow for the power expended. Since absolute laminar flow is theoretical, it has been my purpose to provide a valve of the character in which I am especially interested, which allows and provides for economically feasible streamline or laminar flow of the fluids through the valve.

I have successfully achieved such economically feasible streamline flow by so constructing and designing the valve of this invention, that there is a straight through flow of the fluid within the valve, a minimum of projections into the fluid flow stream, with the projection (the flow controlling portion of the plunger) being streamlined and providing a minimum of wall friction in the flow line of the valve.

Straight through flow within the valve is desirable to achieve my results, since any directional change of the flow stream within the valve slows the flow of the fluid stream, thus, the ideal flow path is linear.

Projections into the flow stream are objectionable because such projections will slow the flow of the fluid within the valve since the flow chamber's area will thereby be reduced and such projections will cause turbulence in the flow stream. In the valve of this invention, the only projection is the portion of the flow controlling plunger which projects various predetermined distances into the stream to thereby control the amount of fluid passing through the valve, and I have made this projection, or portion of the plunger, of streamlined configuration to thereby reduce turbulence in the stream of fluid passing through the valve. Due to this configuration of the operative portion of the plunger, streamline flow is maintained during most of its operative travel into the flow path. While at near closure of the streamlined portion of the plunger turbulence does become violent, this is no longer a valid consideration at this point of operation of the valve.

It is, of course, highly desirable to eliminate wall friction within the flow line to as great an extent as possible in order to obtain the wanted laminar flow of the fluid. Thus, the smoother the wall of the flow line within the valve, the more laminar or streamline the flow of the fluid through the valve. I have, to a substantial degree, overcome this wall friction by first drilling and then reaming the flow line or chamber in my valve.

I have so designed this valve that the flow controlling plunger operates in an area of lower than line pressure. This highly desirable construction is based on Bernouill's Equation, which, stated very simply, indicates that pressure decreases as velocity increases. ($V_1$ $P_1$; $V_2$ $P_{1/2}$.) As velocity is doubled, pressure is halved. Consequently, rather than have the fluid flow controlling plunger operate against the full fluid pressure, I have designed it so that at any position less than full open, fluid velocity will be increased, and as a result, pressure decreased.

I provide any suitable means for operating and closing the valve, and such means is operable to provide for closing the valve in degrees. Also I may provide for control of the means by any suitable programming mechanism which may be conventional in the art. It is preferable that the means, which may be an electric motor, locks at each stop, i.e., at each degree of closure of the valve. It will be recognized that by such an arrangement, I have provided a valve having automatic flow control.

This automatic flow control arrangement which combines the motor with the valve and particularly with the plunger thereof, provides an operating connection between the motor and the plunger or valve opening and closing element, and I have provided a unique construction to reduce strain on the operating connection and the motor when the valve is operating under very high pressures. I have devised a structural means to reduce the aforesaid strains so that the line pressure will be identical in front of and behind the flow controlling plunger. As a result, plunger movement will be no more difficult at 10,000 p.s.i. than at 10 p.s.i.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in perspective of the valve and controlling motor combination.

FIG. 2 is a sectional view through the valve and the valve body, with the plunger in fully open position.

FIG. 3 is a view similar to FIG. 2, but with the plunger in position partially closing the fluid flow line.

FIG. 4 is a view similar to FIGS. 2 and 3 but with the plunger in position fully closing the fluid flow line through the valve.

In the accompanying drawings, and particularly FIG. 1 thereof, I have illustrated the combination of the valve body, the controlling motor and any suitable type of programmer or the like controlling means for the motor, and I have designated the valve body in its entirety by the numeral 1, the motor by the numeral 3 and the programmer by the numeral 5.

The valve body 1 comprises what I shall term, a base portion 7, and inclined rising section, or plunger housing 9, in which the plunger is operable, as will be explained, and the flow duct or path 11 which extends in a straight line through the base portion 1 of the valve body. The valve is connected in any suitable manner to a source of the fluid being controlled by the valve, and the end of fluid flow duct 11 which I have designated by the numeral 13 is the inlet end and the end 15 is the outlet end, the valve, or controlling plunger, of course, being operatively positioned between the said inlet and outlet for control of the fluid flowing through the valve.

The valve body may be formed of any suitable material, preferably, though not necessarily of metal, and the fluid flow duct 11 is first drilled in the body in a straight line direction and is then reamed in order to present a smooth interior surface to substantially reduce friction of the fluid flowing through the fluid flow duct with the walls thereof. As I have stated, the smoother the walls of the flow duct, the more laminar or streamline the flow of the fluid therethrough.

The rising section or plunger housing 9 of the valve body is drilled, or otherwise formed, with an opening 17 extending therethrough from substantially the upper end thereof, to and in communication with the fluid flow duct 11. The opening 17 is formed at an angle with respect to the axis of the duct 11 which may be on the order of 26°. Operatively mounted within the opening 17 is a plunger which I have designated in its entirety by the numeral 19. The plunger 19 is of a diameter so that it will have a sliding fit within the opening 17, and the plunger is of elongated configuration. The operating end 21 of the plunger is tapered or of conical construction, the degree of taper or bevel being such that the lower wall thereof is substantially parallel to the axis of the duct 11, so that in open position, or in any degree of closing position, or when closed, such taper of the lower wall will be substantially parallel to said axis of the duct 11. The tapered operating end or nose 21 of the plunger is formed with a circumferential O ring seat, and two rearwardly disposed spaced apart O ring seats 25 and 27 are formed about the plunger. The plunger is formed with a pressure equalization duct 29 which extends from and through the apex of the tapered operating nose portion 21 of the plunger and rearwardly therethrough. The plunger is of less length than the length of the opening 17 so that a pressure equalization chamber 31 is provided in the opening 17 at the rear of the plunger. This pressure equalization chamber is closed by a cap 33. It will now be appreciated that the pressure equalization duct extends through the tip or apex of the conical or tapered nose of the plunger in communication with duct 11 and through the plunger and is in communication with the chamber 31. On its lower side, the plunger 19 is provided with a rack 35 which is in mesh with a pinion 37.

The motor 3 may be mounted on the valve body by any suitable means, which may be screws 38, and I provide a screw cap 39 covering the pinion gear. The valve body is drilled with a bore 41 through which extend the motor shaft 43 which mounts on its end the pinion 37. Thus, upon operation of the motor, the shaft 43 and pinion 37 are rotated in one direction or the other to move the plunger either toward or away from the duct 11. As will be evident to one skilled in the art, the operation of the motor 3 will be automatically controlled by the programmer 5, so that the valve plunger will be moved to predetermined degrees of closing, to fully closed position and to fully open position. Now with the valve in fully open condition as illustrated in FIG. 2 of the drawings, it will be recognized that the flow of fluid through the valve will be fully in a straight line, there will be no substantial turbulence of the fluid, substantially no resistance to the flow thereof so that there will be an unbroken flow of the fluid through the valve. Since I have so constructed and arranged my valve with the valve plunger operating at an inclination to the fluid flow duct 11, the valve plunger will move to any degree of closing, or to closed position, in the direction of the flow of the fluid. Thus, the plunger operates at any position, with the full fluid pressure rather than against it, so that the fluid velocity will be increased, and pressure decreased with the result that the controlling plunger operates in an area of lower than line pressure. The operating nose 21 of the plunger 19 constitutes, in any of its closing positions, a projection extending into the fluid flow stream, and since it is tapered and of streamline configuration, streamline flow of the fluid is maintained throughout the major part of the travel of the operating nose 21 into the path of the fluid flow.

It will be recognized that the fluid flow through the duct of the valve may be metered, dependent upon the degree of extension of the tapered nose of the plunger into the fluid flow duct. It will also be clear that because of the construction of the nose of the plunger, which is streamlined, the turbulence of the fluid will be reduced at all positions thereof, except at near closure. With my invention there will be no substantial change in the direction of flow of the fluid when the plunger is in different degrees of closing the fluid flow duct.

The unique construction of the pressure duct through the plunger is exceptionally useful when operating at high pressures. Under high pressures in the absence of the pressure duct through the plunger, the strain on the motor rack and pinion would be severe and perhaps damaging. Such strain has been eliminated and the line pressure will be identical in front of, and behind the plunger.

I claim:

1. A valve, comprising a valve body provided with a straight through fluid flow path, a valve control member operatively mounted in said body for projection into said fluid flow path to positions therein reducing the flow of fluid through the valve body and to a position closing the fluid flow path, said valve control member being disposed at an angle to said fluid flow path and operable in its travel therethrough in a direction generally the same as the direction of flow of the fluid through the valve body but inclined with respect thereto, and said valve control member being provided with an operating nose projectible into the fluid flow path, and said operating nose being of tapered, conical, streamline configuration having an exterior surface, the curvature of which is constant, and the lower arcuate surface of said operating nose extends in a plane parallel to the axis of the fluid flow path in all of the operating positions of said operating nose.

2. A valve, comprising a valve body provided with a straight through fluid flow path, a valve control member operatively mounted in said body for projection into said fluid flow path to positions therein reducing the flow of fluid through the valve body and to a position closing the fluid flow path, said valve control member being disposed at an angle to said fluid flow path and operable in its travel therethrough in a direction generally the same as the direction of flow of the fluid through the valve body but inclined with respect thereto, and said valve control member being provided with an operating nose projectible into the fluid flow path, and said operating nose being of tapered, conical, streamline configuration said valve body being formed with an opening therein extending at an angle with respect to the fluid flow path, said valve control member being operable therein and comprises a plunger provided on one end with a tapered streamline operating nose projectible into the fluid flow path, and said valve control member being provided with a longitudinally extending duct therethrough extending through the operating nose and through the other end of the valve control member, the plunger being of less length than the length of the opening in which it operates.

3. A valve in accordance with claim 2, wherein said duct comprises a pressure equalization duct, and the area of the opening behind the plunger comprises a pressure equalization chamber, and said chamber is closed at its rear end.

References Cited
UNITED STATES PATENTS

| | | | |
|---|---|---|---|
| 971,162 | 9/1910 | Winkler | 251—122 X |
| 1,326,998 | 1/1920 | Wallace | 251—122 |
| 2,564,937 | 8/1951 | Wannamaker | 251—133 X |
| 2,954,703 | 10/1960 | Morrell | 251—133 X |
| 2,956,188 | 10/1960 | White | 251—133 X |
| 3,085,590 | 4/1963 | McIlhenny | 251—210 X |
| 3,095,903 | 7/1963 | Jennings | 251—250 X |
| 3,098,637 | 7/1963 | Baustian | 251—122 |
| 3,198,479 | 8/1965 | Greenwood | 251—205 X |
| 3,240,466 | 3/1966 | Meyer | 251—205 X |

M. CARY NELSON, *Primary Examiner.*

R. C. MILLER, *Assistant Examiner.*